United States Patent [19]

Willard

[11] 4,056,893
[45] Nov. 8, 1977

[54] ECCENTRIC RETAINING BOLT FOR EARTHWORKING TOOLS AND METHOD

[75] Inventor: Kaarlela O. Willard, Chillicothe, Ill.

[73] Assignee: Caterpillar Tractor Co., Peoria, Ill.

[21] Appl. No.: 657,987

[22] Filed: Feb. 13, 1976

[51] Int. Cl.² .............................................. E02F 9/28
[52] U.S. Cl. ............................. 37/142 R; 151/19 A; 151/19 R
[58] Field of Search ............ 37/142 R, 142 A, 141 R, 37/141 T, 135; 151/19 R, 19 A, 2 R

[56] References Cited

U.S. PATENT DOCUMENTS

| 1,076,548 | 10/1913 | Butler | 37/141 R |
|---|---|---|---|
| 1,451,014 | 4/1923 | Fether | 151/19 A |
| 1,844,858 | 2/1932 | Lehman | 37/135 |
| 1,959,847 | 5/1934 | Van Buskirk | 37/141 T |
| 2,118,872 | 5/1938 | Weimer | 37/142 R |
| 2,134,344 | 10/1938 | Seal | 37/142 R |
| 2,866,280 | 12/1958 | O'Connor | 37/141 R |
| 2,882,948 | 4/1959 | Wallace | 151/19 R |
| 3,006,443 | 10/1961 | Siler | 151/19 A |
| 3,371,437 | 3/1968 | Wilson et al. | 37/142 R |
| 3,511,289 | 5/1970 | Coyle | 37/142 A X |

FOREIGN PATENT DOCUMENTS

| 101,210 | 6/1937 | Australia | 151/19 R |
|---|---|---|---|
| 953,918 | 12/1949 | France | 151/19 A |
| 1,139,331 | 8/1960 | Germany | 151/19 A |
| 62,808 | 10/1944 | Netherlands | 151/19 R |
| 154,890 | 8/1932 | Switzerland | 151/19 R |
| 207,907 | 12/1923 | United Kingdom | 151/19 R |

*Primary Examiner*—E. H. Eickholt
*Attorney, Agent, or Firm*—Phillips, Moore, Weissenberger, Lempio & Majestic

[57] ABSTRACT

A loader bucket comprises a support member having a cutting edge disposed forwardly thereon. An adapter, having an earthworking tip detachably mounted thereon, is detachably mounted on the cutting edge and defines a bearing surface contacting a forward edge thereof. A single bolt detachably mounts the adapter on the cutting edge and comprises an eccentric cam formed thereon to effect the above bearing contact upon rotation thereof. The head of the bolt has a plurality of circumferentially disposed teeth formed thereon which engage like-shaped notches formed in a counterbore, defined in the adapter, to prevent rotation of the bolt. A nut is threadably mounted on a lower end of the bolt to further secure the adapter in place on the cutting edge.

7 Claims, 5 Drawing Figures

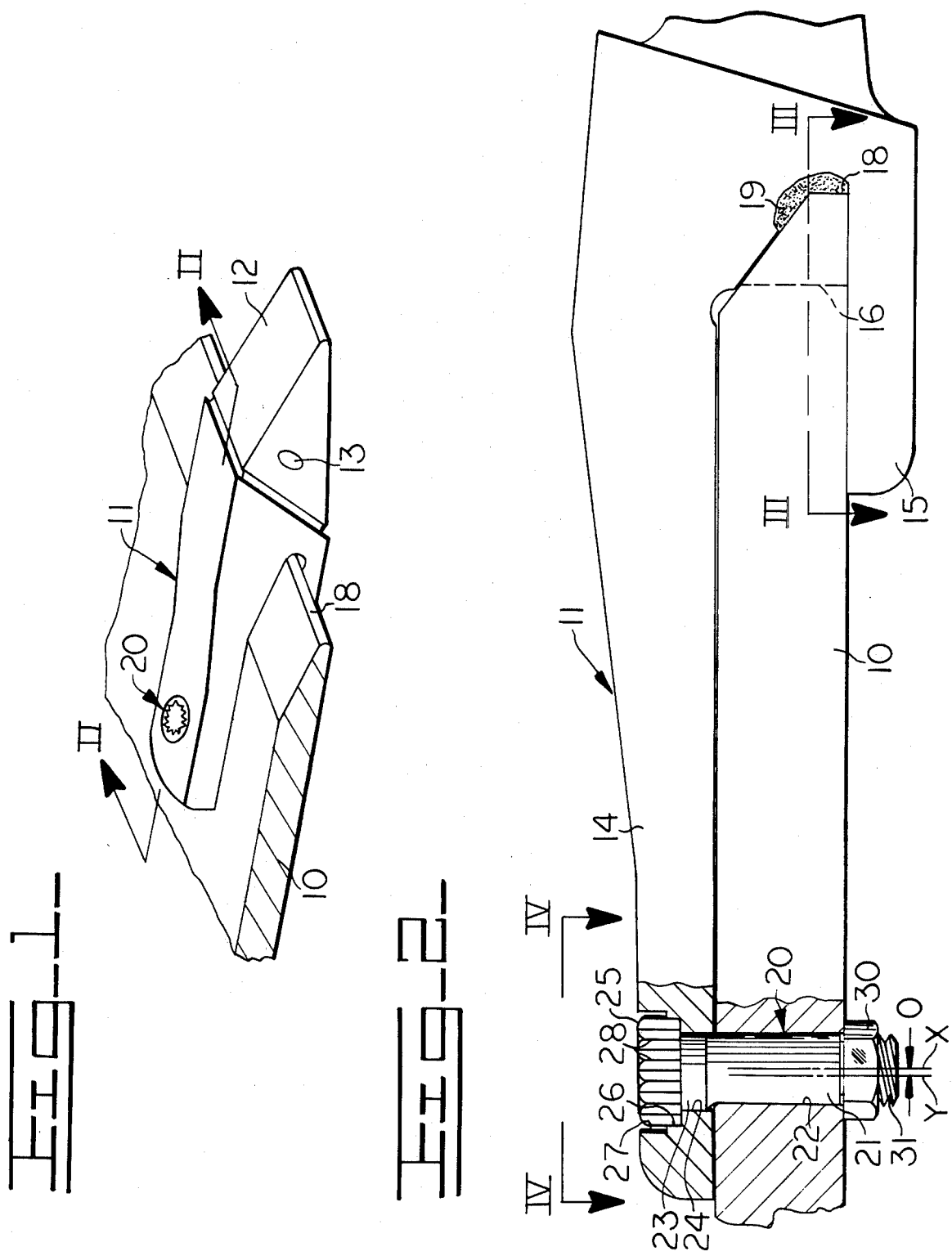

ECCENTRIC RETAINING BOLT FOR EARTHWORKING TOOLS AND METHOD

BACKGROUND OF THE INVENTION

A conventional loader bucket comprises a bottom wall having a cutting edge secured forwardly thereon. A plurality of tip-carrying adapters are normally attached on the cutting edge. Each adapter is normally secured in place on the cutting edge by a plurality of bolts which are oftentimes subjected to shearing forces imposed thereon during an earthworking operation. In order to alleviate shearing stresses imposed on the bolts, it has been proposed to provide a bearing contact between the adapter and a forward surface of the cutting edge to substantially absorb digging forces thereat. In order to provide such bearing contact close manufacturing tolerances must be designed into the integrated adapter arrangement.

SUMMARY OF THIS INVENTION

An object of this invention is to provide an improved, non-complex and economical means for detachably mounting a tip-carrying adapter on a support member, such as the cutting edge of a loader bucket. As will be hereinafter more fully appreciated, such means has broader applications wherein it is desired to cam a pair of members into bearing contact prior to their attachment to each other.

In applications wherein such means is employed to detachably mount an adapter on a support member, such as the cutting edge of a loader bucket, a bearing surface defined on the adapter is drawn into bearing contact with a forward edge of the support member upon rotation of such means. The means preferably comprises a bolt disposed in aligned bores formed through the adapter and support member and an eccentric cam formed on the bolt to effect such bearing contact prior to the securance of a nut in place on the bolt. In addition, anti-rotation means are preferably formed on a head of the bolt and within a counterbore formed in the adapter to prevent rotation of the bolt.

In carrying forth the method teachings of this invention, whereby the adapter is installed on the support member, the adapter is initially mounted on the support member to place the bearing surface thereof in close opposition to the forward edge of the support member. The bolt is mounted in the aligned bores formed through the adapter and support member and rotated therein to simultaneously draw the bearing surface to bearing contact with the forward edge of the support member. The bolt is then moved axially to effect the above-mentioned anti-rotation desiderata and the nut is thereafter threadably secured on a lower end of the bolt. The method is thus economical, expeditious and assures a high-degree of structural integrity and tightness between the cutting edge and adapter.

BRIEF DESCRIPTION OF THE DRAWINGS

Other objects of this invention will become apparent from the following description and accompanying drawings wherein:

FIG. 1 is a perspective view of a tip-carrying adapter detachably mounted on a partially illustrated cutting edge of a loader bucket;

FIG. 2 is an enlarged sectional view in elevation, taken in the direction of arrows II—II in FIG. 1;

DETAILED DESCRIPTION

FIG. 1 partially illustrates a cutting edge 10 of a loader bucket having a plurality of adapters 11 (one shown) mounted in straddling relationship thereon. Although the hereinafter described invention is particularly adapted for use with work tools for construction vehicles, such as loader buckets, it will be understood that such invention is adapted for other applications wherein it is desired to detachably connect a pair of members together. In the herein described loader bucket application, a hardened earthworking tip 12 is detachably mounted on a forward end of the adapter in a conventional manner by a pin 13.

Figure 3:
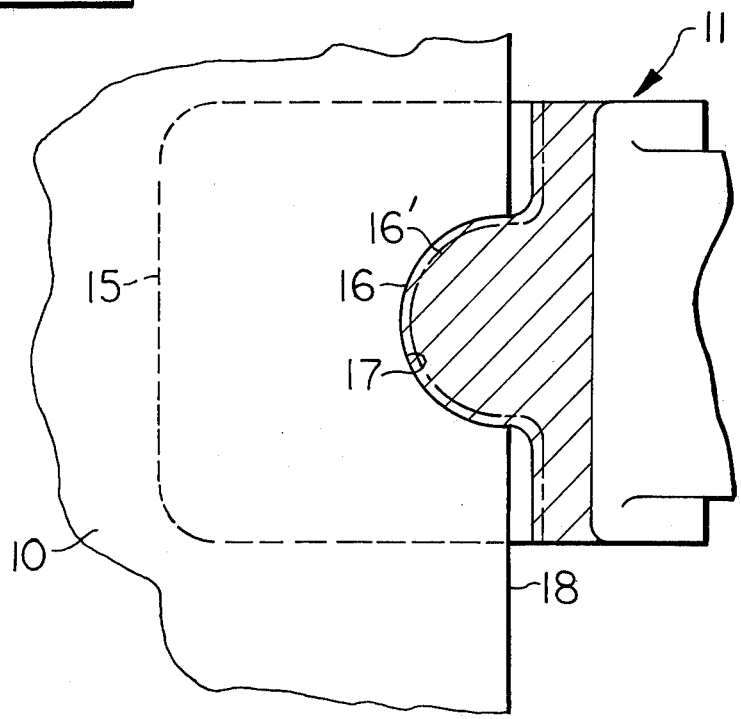
FIG. 3 is a sectional view in top plan, taken in the direction of arrows III—III in FIG. 2, to illustrate a bearing contact between the adapter and cutting edge.

Referring to FIGS. 2 and 3, the adapter comprises an upper portion 14 disposed in overlying relationship on an upper surface of the cutting edge and a lower portion 15 disposed in underlying relationship on a lower surface of the cutting edge. An arcuate bearing surface 16 is defined on the adapter, between the upper and lower portions thereof, and is accommodated within a like-shaped cut-out 17 defined on a forward edge 18 of cutting edge 10. If so desired, an elastomeric or other suitable filling material 19 can be utilized to fill the voids between the forward edge of the cutting edge and the adapter.

Figure 4:
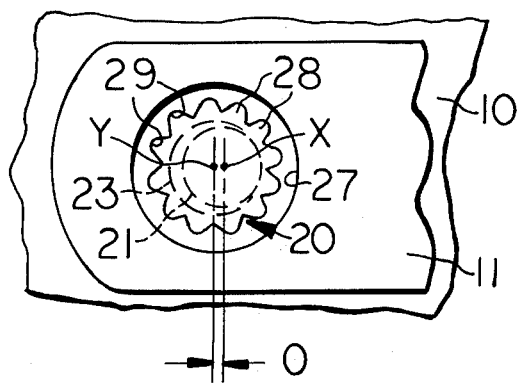
FIG. 4 is a top plan view taken in the direction of arrows IV—IV in FIG. 2, illustrating the disposition of a bolt employed to connect the adapter to the cutting edge.
Figure 5:
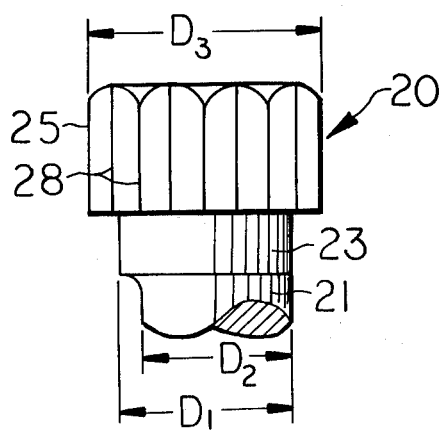
FIG. 5 is an enlarged elevational view, partially illustrating the bolt.

The means for detachably mounting the adapter on the cutting edge and for drawing bearing surface 16 into bearing contact with the forward edge of the cutting edge will now be described. As shown in FIGS. 2, 4 and 5, a bolt 20 has a cylindrical shank 21 having a diameter $D_1$ and is disposed in a bore 22 formed through the cutting edge. A cylindrical cam means 23, having an outer diameter $D_2$ larger than diameter $D_1$, is disposed in a bore 24, formed in upper portion 14 of the adapter.

As shown in FIGS. 2 and 4, a longitudinal axis Y of the eccentric cam means is disposed in offset relationship O relative to a longitudinal axis X of shank 21 to draw bearing surface 16 of the adapter into bearing contact with the forward edge of cutting edge 10 upon the hereinafter described attachment of the adapter on the cutting edge. The first or upper end of the bolt has a head 25 integrally formed thereon which has its lower portion disposed in a first counterbore 26 and its upper portion disposed in a second larger counterbore 27. Outer diameter $D_3$ of head 25 subscribes the apexes of a plurality of teeth 28 formed on the periphery of the head to project radially outwardly therefrom.

The lower portions of the teeth are disposed within a plurality of accommodating notches 29, formed in counterbore 26 to provide anti-rotation means therewith for preventing the bolt from rotating relative to the adapter. A nut 30 is threadably mounted on spiral threads 31 formed on a lower, second end of the bolt for preventing axial movement thereof relative to the cutting edge and adapter. The method for installing the adapter on the cutting edge or support member 10 will now be described.

Prior to installation of bolt 20, adapter 11 is mounted on cutting edge 10 to place bearing surface 16 in close opposition to forward edge portions of the cutting edge, defined by arcuate cut-out 17, as indicated at 16' in FIG. 3. Bolt 20 is then mounted in aligned bores 22 and 24 and the bolt is disposed at a first position which is 180° apart circumferentially from that illustrated in FIGS. 2 and 4. In addition, the lower edge of bolt head 25 is maintained above counterbore 26 to facilitate rotation thereof.

The bolt is then rotated to engage lower portions of cam 23 within upper portions of bore 24 to simultaneously draw the adapter leftwardly in FIG. 2 to effect the illustrated bearing contact at bearing surface 16 of the adapter, as illustrated. The bolt is then locked against rotation relative to the adapter, by moving the bolt axially downwardly to a second position to engage teeth 28 within notches 29. The bolt is then locked against axial movement, relative to the adapter and the cutting edge, by threadably mounting nut 30 on lower end 31 of the bolt. Tip 12 (FIG. 1) is then mounted on the forward end of the adapter and retained thereon by a locking pin 13 in a conventional manner.

What is claimed is:

1. A work tool for construction vehicles comprising a support member defining a forward edge thereon, an adapter mounted on said support member and defining a bearing surface thereon maintained in bearing contact with the forward edge of said support member,
an earthworking tip mounted on a forward end of said adapter,
means, including a bolt having eccentric cam means formed thereon, detachably mounting said adapter on said support member and for providing and maintaining the bearing surface of said adapter in bearing contact with the forward edge of said support member said cam means comprising a cylindrical cam having a longitudinal axis thereof disposed in offset relationship relative to a longitudinal axis of a shank of said bolt and disposed within a bore formed in said adapter, and anti-rotation means for preventing said bolt from rotating relative to said adapter comprising a head secured on a first end of said bolt, a plurality of teeth formed circumferentially on the periphery of said head to project radially outwardly therefrom and a plurality of notches formed circumferentially within a counterbore defined within the bore formed in said adapter, said teeth disposed within said notches for preventing said bolt from rotating relative to said adapter.

2. The work tool of claim 1 wherein at least a portion of said bearing surface is arcuate and wherein an arcuate cut-out is defined on the forward edge of said support member and accommodates said bearing surface therein.

3. The work tool of claim 1 wherein said adapter straddles the forward edge of said support member and further comprises an upper portion disposed on an upper surface of said support member and a lower portion disposed on a lower surface of said support member, said bearing surface being disposed between said upper and lower portions.

4. The work tool of claim 3 wherein said bolt is disposed in aligned bores formed through the upper portion of said adapter and through said support member.

5. The work tool of claim 1 wherein said bolt has said cam means formed on an upper end thereof for drawing said bearing surface into bearing contact with said forward edge.

6. The work tool of claim 1 wherein said cam means comprises a cylindrical cam having a longitudinal axis thereof disposed in offset relationship relative to a longitudinal axis of a shank of said bolt and disposed within a bore formed in said adapter.

7. The work tool of claim 1 wherein said firstmentioned means further comprises a nut threadably mounted on a second end of said bolt for preventing axial movement thereof relative to said support member and said adapter.

* * * * *